United States Patent
Cox et al.

(10) Patent No.: US 9,219,880 B2
(45) Date of Patent: Dec. 22, 2015

(54) VIDEO CONFERENCE WINDOW ACTIVATOR

(71) Applicant: International Business Machines Corporation, Armonk, NY (US)

(72) Inventors: Benjamin D. Cox, Winchester (GB); Daniel P. Craggs, Montreal (CA)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 14/183,570

(22) Filed: Feb. 19, 2014

(65) Prior Publication Data
US 2015/0237302 A1    Aug. 20, 2015

(51) Int. Cl.
H04N 7/15    (2006.01)
H04N 7/01    (2006.01)

(52) U.S. Cl.
CPC ............... H04N 7/15 (2013.01); H04N 7/0122 (2013.01)

(58) Field of Classification Search
CPC ........... H04N 7/15; H04N 7/152; H04N 7/14; H04N 7/142
USPC .............................. 348/14.01–14.16; 709/204
See application file for complete search history.

(56) References Cited

U.S. PATENT DOCUMENTS

| | | | |
|---|---|---|---|
| 7,526,725 B2* | 4/2009 | Forlines | 715/723 |
| 7,612,792 B1 | 11/2009 | Beck et al. | |
| 7,692,683 B2 | 4/2010 | Kenoyer et al. | |
| 8,208,001 B2 | 6/2012 | Tucker et al. | |
| 2011/0211114 A1* | 9/2011 | Cooper | 348/441 |
| 2012/0242776 A1 | 9/2012 | Tucker et al. | |
| 2012/0327177 A1* | 12/2012 | Kee et al. | 348/14.08 |
| 2013/0141518 A1* | 6/2013 | Chou | 348/14.08 |
| 2014/0003450 A1* | 1/2014 | Bentley et al. | 370/468 |

FOREIGN PATENT DOCUMENTS

| | | |
|---|---|---|
| WO | 2008134301 A1 | 11/2008 |
| WO | 2013172848 A1 | 11/2013 |

OTHER PUBLICATIONS

Tangeland et al., "Dynamically Adjusted Video Framing Based on Speaker Position and Face Orientation", IP.COM No. IPCOM000227963D, IP.com Electronic Publication: May 30, 2013, pp. 1-5.

(Continued)

*Primary Examiner* — Melur Ramakrishnaiah
(74) *Attorney, Agent, or Firm* — Patrica B. Feighan; Ryan Lewis

(57) ABSTRACT

A method for activating a video conference between at least one local watcher using a local communication enabled device and at least one remote watcher using a remote communication enabled device is provided. The method may include detecting the at least one local watcher and the at least one remote watcher at each respective communication enabled device. The method may also include transmitting a video signal and an audio signal between the local communication enabled device and the remote communication enabled device based on the detecting of both the at least one local watcher and the at least one remote watcher at each respective communication enabled device. The method may further include transmitting a single captured image between the local communication enabled device and the remote communication enabled device based on the detecting of one of the at least one local watcher and the at least one remote watcher.

20 Claims, 4 Drawing Sheets

(56) References Cited

OTHER PUBLICATIONS

Whitehead, "Reducing Video Chat Bandwidth by Studying the Human Gaze", utepnews.edu, pp. 1-3.

Saikat Baso, "5 Ways to Find Duplicate Image Files on Windows PC", http://www.makeuseof.cornitag/5-ways-to-find-duplicate-image-files-on-yourcomputer-windows/, Jan. 16, 2009, accessed on Feb. 12, 2014, pp. 1-27.

\* cited by examiner

VIDEO CONFERENCE WINDOW ACTIVATOR

FIELD OF THE INVENTION

The present invention relates generally to the field of communications, and more particularly to telecommunications.

BACKGROUND

Video calling is a common occurrence within modern day life, both socially and professionally. Video calling is based upon telecommunication technologies for the reception and transmission of audio-video signals by users at different locations, for communication between people in real-time. The telecommunication technologies allow two or more locations to communicate by simultaneous two-way video and audio transmissions. Generally video calls may use the same method of contact initiation as voice only communication. For example, one person calls the other person and then the other person answers the call. However, video calling telecommunication may lead to a less natural way of communication than what is possible. For example, humans may not always talk immediately when walking into a room with another person and sometimes they will sit quietly for a while. Then, after 10 minutes, the person may decide to say something. As such the video conference may not activate until one person begins speaking. One solution may be to simply leave a video call running constantly. However, such a solution may expend unnecessary bandwidth.

SUMMARY

According to one embodiment, a method for activating a video conference between at least one local watcher using a local communication enabled device and at least one remote watcher using a remote communication enabled device is provided. The method may include detecting the at least one local watcher and the at least one remote watcher at each respective communication enabled device. The method may also include transmitting a video signal and an audio signal between the local communication enabled device and the remote communication enabled device based on the detecting of both the at least one local watcher and the at least one remote watcher at each respective communication enabled device. Additionally, the method may include transmitting a single captured image between the local communication enabled device and the remote communication enabled device based on the detecting of one of the at least one local watcher and the at least one remote watcher at each respective communication enabled device, wherein the transmitting of the single captured image reduces bandwidth relative to the transmitting of the video signal and the audio signal.

According to another embodiment, a computer system for activating a video conference between at least one local watcher using a local communication enabled device and at least one remote watcher using a remote communication enabled device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include detecting the at least one local watcher and the at least one remote watcher at each respective communication enabled device. The method may also include transmitting a video signal and an audio signal between the local communication enabled device and the remote communication enabled device based on the detecting of both the at least one local watcher and the at least one remote watcher at each respective communication enabled device. Additionally, the method may include transmitting a single captured image between the local communication enabled device and the remote communication enabled device based on the detecting of one of the at least one local watcher and the at least one remote watcher at each respective communication enabled device, wherein the transmitting of the single captured image reduces bandwidth relative to the transmitting of the video signal and the audio signal.

According to yet another embodiment, a computer program product for system for activating a video conference between at least one local watcher using a local communication enabled device and at least one remote watcher using a remote communication enabled device is provided. The computer program product may include one or more computer-readable storage devices and program instructions stored on at least one of the one or more tangible storage devices, the program instructions executable by a processor. The computer program product may also include program instructions to detect the at least one local watcher and the at least one remote watcher at each respective communication enabled device. The computer program product may further include program instructions to transmit a video signal and an audio signal between the local communication enabled device and the remote communication enabled device based on the detecting of both the at least one local watcher and the at least one remote watcher at each respective communication enabled device. Additionally, the computer program product may also include program instructions to transmit a single captured image between the local communication enabled device and the remote communication enabled device based on the detecting of one of the at least one local watcher and the at least one remote watcher at each respective communication enabled device, wherein the transmitting of the single captured image reduces bandwidth relative to the transmitting of the video signal and the audio signal.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
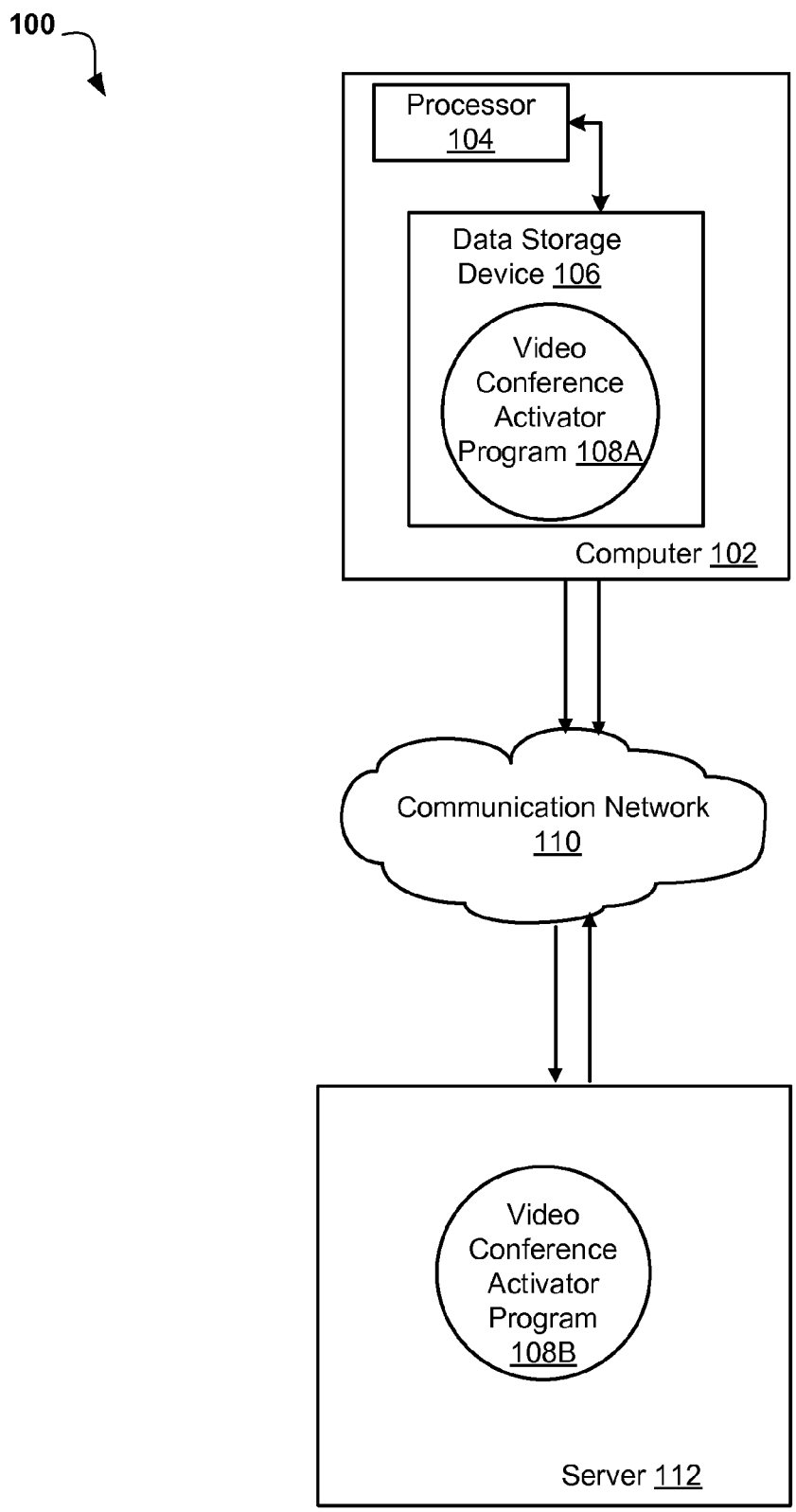
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of communications, and more particularly to telecommunications. The following described exemplary embodiments provide a system, method and program product for, among other things, activating a video conference.

As previously described video calling is a common occurrence within modern day life, both socially and professionally. Video calling or conferencing is a way of communicating that is able to connect people that are in different physical locations with video, audio, and computer technology. The method that is most commonly used to connect different individuals for a video call is through a computer network. The basic idea of a video call is that the computer network operates as a central hub where all the participants go to connect in to the conference. Generally video calls may use the same method of contact initiation as voice only communication. However, video calling telecommunication may lead to a less natural way of communication than what is possible since a video call may not be activated until one person begins to speak. One solution may be to simply leave a video call running constantly. However, such a solution may cost a lot of bandwidth to both parties on either side of the call. As such, it may be advantageous, among other things, to implement a method of detecting when it may be useful to transmit video and audio, and when it may not be beneficial to transmit video and audio.

Therefore, video and audio may only be transmitted when the system detects that such transmission may be useful. For example, simply walking into a room, a person may be able to see a portal or window into another room across the globe. The benefits of such an environment may work in a business and a social environment. As such, a portal may be created between two rooms that are potentially thousands of miles apart in order to provide a casual way of starting a conversation. A person may simply wave, or even may make a passing comment to start the conversation, which may thus make it more comfortable for people to have silences and multi-task during a video call, as experienced during a natural conversation. This may also ease the strains and difficulties that occur in businesses that operate offices and teams that are global. This may reduce the impacts of teams not having 'face to face' contact if they saw team members regularly (at least virtually) from day to day without a predefined purpose.

According to at least one embodiment, a video conference activator may be implemented. The video conference activator system may comprise of devices, such as sensors, a microphone, and a camera (with facial recognition software) which may be incorporated into other devices such as, but not limited to a computer, a tablet, a mobile device, a server or a screen. According to one or more exemplary embodiments, a video call with a second similar device may be held. The bandwidth usage may be minimized by the method analyzing an image locally and then transmitting a video when the method determines it may be valuable or necessary to do so. Additionally, the method may also determine the most appropriate resolution (i.e., screen resolution) to use when the video is transmitted. For example, a person who may be located far away from the display may not require as great a resolution as a person who may be situated closer to the display.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for activating a video conference. Embodiments of the present invention may save bandwidth associated with a video conference call by limiting the transmission of video and audio. According to at least one implementation of the present invention, a user may set options and based on the user-set options, video may be transmitted from a device (i.e., a communication enabled device) when the selected criteria are met. The selected criteria may include, but is not limited to, movement being detected by both devices involved in the video conference call; faces being detected by both devices involved in the video conference call; or faces being detected by one device involved in the video conference call and movement being detected on the other device involved in the video conference call. Then, if only one device detects movement or a face, a 'resting image' (i.e., a single captured image) may be displayed. The 'resting image' may be the most recent image before movement ceased on the camera. Since, motion detection may not detect a slow change, such as daylight change, the device may compare the last resting image that was transmitted with the device's current resting image periodically using existing technology.

As such, the device may calculate whether or not the device's current resting image is below a similarity threshold. This calculation may be performed locally on the device. If the current resting image is below a similarity threshold then, the system may transmit a new resting image. However, if no faces or movement is detected, then neither device may transmit a video signal. According to one implementation, it may be optional whether or not resting updates may occur whenever video isn't being transmitted. As such, the resting updates may assist in creating the illusion that the video call is always 'on' and therefore, people may not see images updated when they enter a room. Furthermore, according to an alternative embodiment, displays may turn off during phases of no detection (i.e., movement and/or facial recognition) in order to save energy. Additionally, audio may be transmitted at identical times to video transmission, or independently, by detecting and transmitting any audio over a certain threshold. As such, the thresholds may be detected by the device calculating the background noise level and transmitting audio that exceeds the threshold.

Referring now to FIG. 1, an exemplary networked computer environment 100 in accordance with one embodiment is depicted. The networked computer environment 100 may include a computer 102 with a processor 104 and a data storage device 106 that is enabled to run a video conference activator program 108A. The networked computer environment 100 may also include a server 112 that is enabled to run a video conference activator program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a video conference activator program 108A and 108B may run on the client computer 102 or on the server computer 112. As previously described, the video conference activator system may comprise of devices, such as sensors, a microphone, and a camera (with facial recognition software) which may be incorporated into transmitting devices (i.e., communication enabled devices) such as, but not limited to a computer 102, a tablet, a mobile device, a server 112 or a screen. Generally, a communication enable device may include any device that incorporates transceiver (i.e., transmit/receive) capabilities. The video conference activator program 108A, 108B may save bandwidth associated with a video conference call by limiting the transmission of video and audio. The video conference call may be between two or more people. It may be streaming video two-ways between all parties participating in the video call or one-way from one party to another party participating on the video conference call. For example, a user using a video conference activator program 108A, running on a client computer 102 may connect via a communication network 110 to server computer 112 which may also be running a video conference activator program 108B. Furthermore, the user using client computer 102 or server 112 may utilize the video conference activator program 108A, 108B to set options and based on the user-set options, video may be transmitted from a transmitting device (i.e., communication enabled device), such as client computer 102 or server 112 when the selected criteria are met. The video conference activator method is explained in further detail below with respect to FIG. 2

Figure 2A:
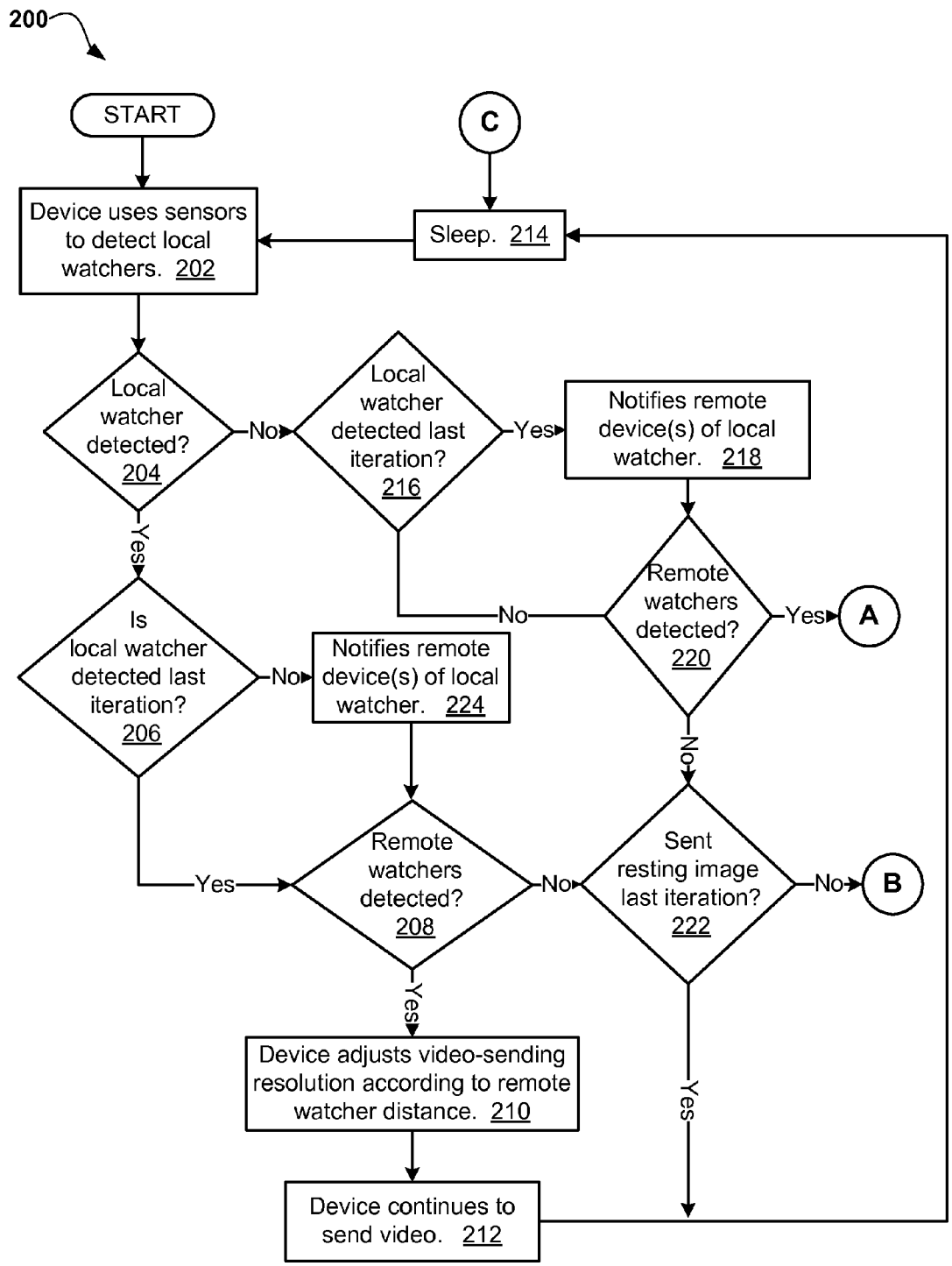
FIGS. 2A-2B is an operational flowchart illustrating the steps carried out by a program for activating a video conference according to at least one embodiment.
Figure 2B:
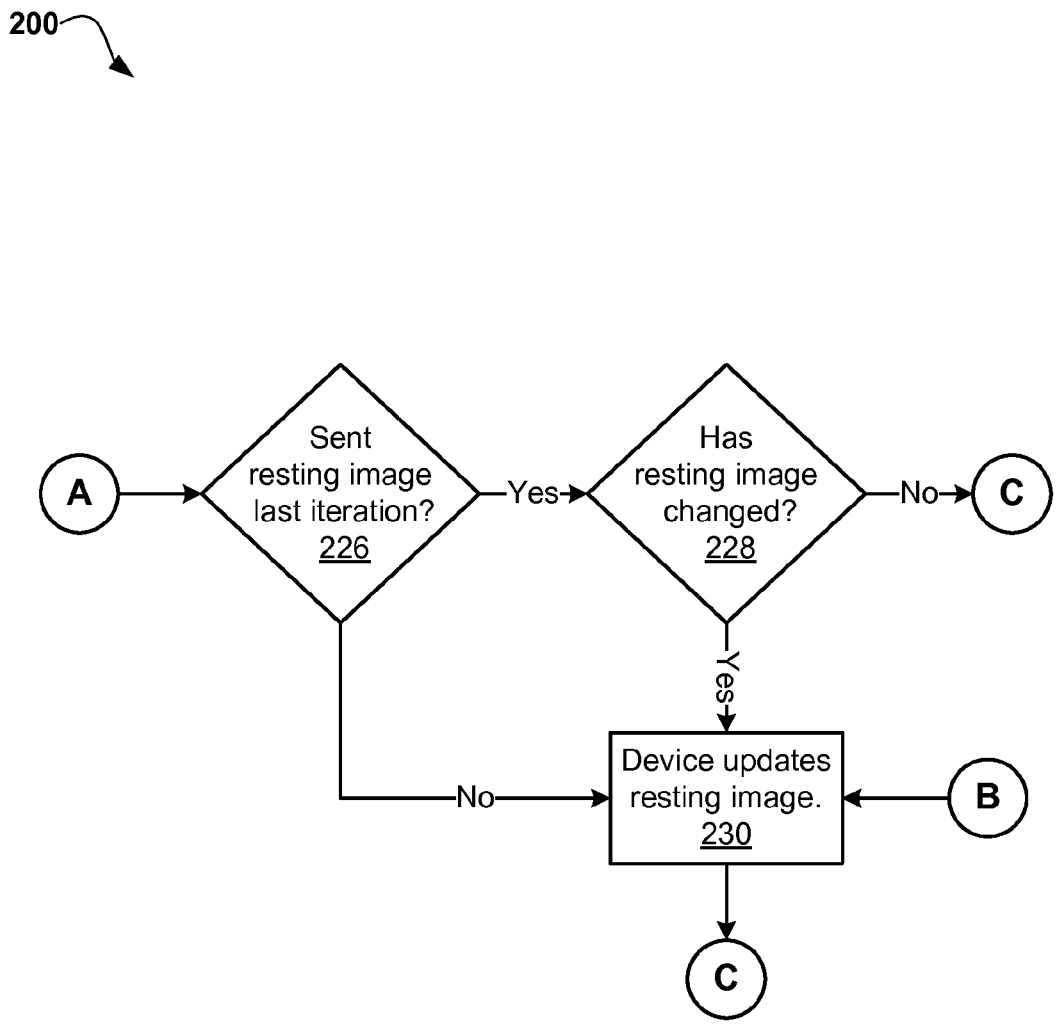

Referring now to FIG. 2, an operational flowchart illustrating the steps carried out by a program for activating a video conference according to at least one embodiment is depicted. For example, the video conference activator program 108A, 108B (FIG. 1) may be implemented as running on a client computer 102 (FIG. 1) or server computer 112 (FIG. 1). As previously described, the video conference activator system may comprise of devices, such as sensors, a microphone, and a camera (with facial recognition software) which may be incorporated into other devices (i.e., transmitting devices) such as, but not limited to a computer 102 (FIG. 1), a tablet, a mobile device, a server 112 (FIG. 1) or a screen. A user using client computer 102 (FIG. 1) or server computer 112 (FIG. 1) may execute the video conference activator program 108A, 108B (FIG. 1). Embodiments of the present invention may save bandwidth associated with a video conference call by limiting the transmission of video and audio. As previously described, according to at least one implementation of the present invention, a user may set options. Then, based on the user-set options, video may be transmitted from a transmitting device when the selected criteria are met. The selected criteria may include, but is not limited to movement being detected by both transmitting devices involved in the video conference call; faces being detected by both transmitting devices involved in the video conference call; or faces being detected by one transmitting device involved in the video conference call and movement being detected on the other transmitting device involved in the video conference call. The implementation for activating a video conference is described in more detail below.

With respect to FIG. 2, at 202, the transmitting device uses sensors to detect local watchers. A local watcher is a person participating in the video conference call. Additionally, the local watcher is physically located around the local transmitting device that is capable of transmitting and receiving audio and video. The remote watcher is a remote person participating in the video conference call. The remote watcher is physically located around the remote transmitting device that is capable of transmitting and receiving audio and video. As such, during an initiated video call, the local transmitting device may use sensors to detect if there are any local watchers. For example, a transmitting device, such as a computer 102 (FIG. 1), running video conference activator program 108A (FIG. 1) may use information it is receiving from the local watchers. As such, the computer 102 (FIG. 1) running video conference activator program 108A (FIG. 1) may use existing technology, such as movement detection software, face recognition software, or eye tracking software to detect if there are any local watchers.

Next, at 204, it is determined whether a local watcher has been detected. If it is determined at 204 that a local watcher has been detected then the method may determine at 206, whether there was a local watcher detected during the last iteration of the program. According to one implementation, the answer to the question may default to "no" if this is the first iteration.

If at 206, it is determined that there was not a local watcher detected during the last iteration of the program, then at 224, the method notifies the remote transmitting device(s) that the local transmitting device has a local watcher. If at 206, it is determined that there was a local watcher detected during the last iteration of the program, then at 208 the method may determine whether remote watchers are detected. As such, the server 112 (FIG. 1) running video conference activator program 108B (FIG. 1) may use existing technology, such as detection devices, movement detection software, face recognition software, or eye tracking software to detect if there are any remote watchers.

If at 208, it is determined that there are not any remote watchers located near the remote transmitting device, then at 222 it is determined whether the local transmitting device sent a resting image last iteration. As such, it is determined whether the current single captured image is similar to a last transmitted single captured image. The resting image may be the most recent image before movement ceased on the camera. Since, motion detection may not detect a slow change, such as daylight change, the device may compare the last resting image that was transmitted with the device's current resting image periodically using existing technology. According to one implementation, the answer to the question may default to "no" if this is the first iteration. Step 222 is explained in more detail below.

If at 208 it is determined that remote watchers are detected, then at 210 the remote transmitting device may adjust the video-sending resolution (i.e., screen resolution) associated with the remote communication enabled device according to the remote watcher's distance from the remote communication enabled device. For example, if, the transmitting device successfully received video from the remote watchers, it may, according to at least one implementation, calculate how far the remote watchers are located away from their transmitting device. This calculation may be done using existing technology, such as eye tracking software. For example, a facial recognition system may judge the size of the face and thus calculate the distance a person is away from the transmitting device screen. However, according to another implementation, existing technology may be utilized which uses an estimate of the average human eye width to determine how far away the user may be located. As such, the present embodiment may not require any prior information regarding the user's facial characteristics to aide in the determination of how far the remote watchers are located away from their respective transmitting device.

Since the size of the display is a known quantity, the most optimum resolution may be calculated. As such, the method may adjust the resolution accordingly based on the calculation of how far the remote watchers are located away from their transmitting device. For example, if it is calculated, that the remote watcher is close to the transmitting device, then the resolution may be adjusted to a higher resolution. Conversely, if it is calculated, that the remote watcher is far away from the transmitting device, then the resolution may be adjusted to a lower resolution. In accordance with at least one implementation, existing technology may be used, such as a sliding scale, to adjust the resolution according to the remote watcher's calculated distance from the transmitted device. Additionally, according to another implementation, the local transmitting device may similarly adjust the video-sending resolution according to the local watcher's distance.

Next, at 212 the transmitting device begins to send video and audio, or continues the video and audio stream if the transmitting device was already transmitting video and audio. Next, at 214, the logic sleeps. As such, the logic that is running sleeps until it is next required to run according to pre-determined program instructions.

If it is determined at 204 that a local watcher has not been detected then the method may determine at 216, whether there was a local watcher detected during the last iteration of the program. According to one implementation, the answer to the question may default to "no" if this is the first iteration.

If it is determined at 216, that there was a local watcher detected during the last iteration of the program, then at 218 the method notifies the remote transmitting device(s) that the local transmitting device has a watcher. If it is determined at 216, that there was not a local watcher detected during the last iteration of the program, then, at 220, it is determined whether remote watchers are detected. As such, it is determined, using existing technology, such as detection devices, movement detection software, face recognition software, or eye tracking software to detect if whether there are watchers located near the remote transmitting device. If at 220, it is determined that there are not any watchers located near the remote transmitting device, then at 222 it is determined whether the local transmitting device sent a resting image last iteration. In accordance with some embodiments, the resting image may be the current frame of a watcher on the video camera or the last still image of a watcher on the video camera. According to one implementation, the answer to the question may default to "no" if this is the first iteration. If at 222, it is determined that the local transmitting device sent a resting image last iteration, then at 214, the logic sleeps. As such, the logic that is running sleeps until it is next required to run.

If at 222, it is determined that the local transmitting device did not send a resting image last iteration, then at 230 the local transmitting device updates the resting image. If at 220, it is determined that there are watchers located near the remote transmitting device, then at 226 it is determined whether the local transmitting device sent a resting image last iteration. According to one implementation, the answer to the question may default to "no" if this is the first iteration. If at 226, it is determined that the local transmitting device sent a resting image last iteration, then at 228, it is determined whether the resting image changed in the last iteration. If, at 228, it is determined the resting image changed in the last iteration, then at 230 the transmitting device updates the resting image and at 214, the logic sleeps. As such, the logic that is running sleeps until it is next required to run.

If, at 228, it is determined the resting image did change in the last iteration, then at 214, the logic sleeps. As such, the logic that is running sleeps until it is next required to run. If at 226, it is determined that the local transmitting device did not send a resting image last iteration, then at the transmitting device updates the resting image and at 214, the logic sleeps. As such, the logic that is running sleeps until it is next required to run.

Additionally, in accordance with at least one embodiment, other savings in bandwidth may be found by exclusively transmitting a minimized resolution. For example, a person far away from the display may not need a high resolution broadcast to them. According to one implementation, the distance may be calculated by using known technology, such as the facial recognition system. The facial recognition system may automatically identify or verify a person from a digital image or a video frame from a video source. For example, the facial recognition system may compare selected facial features from the image and a facial database to automatically identify or verify a person. Then, the system may judge the size of the face and calculate a distance the person is away from the screen. Therefore, with the size of the display being a known quantity, the best resolution may be calculated. However, only the minimized resolution suitable to that person may be transmitted. As such, the resolution may be optimized for the person closest to the display. Alternatively, according to another embodiment, the distance to a person may be calculate by using two cameras on the transmitting device where the two cameras may be a set distance apart from one another. Therefore, by using both cameras and tracking a single face, the cameras may use their parallax (a displacement or difference in the apparent position of an object viewed along two different lines of sight) to accurately calculate the distance to the person.

Figure 3:
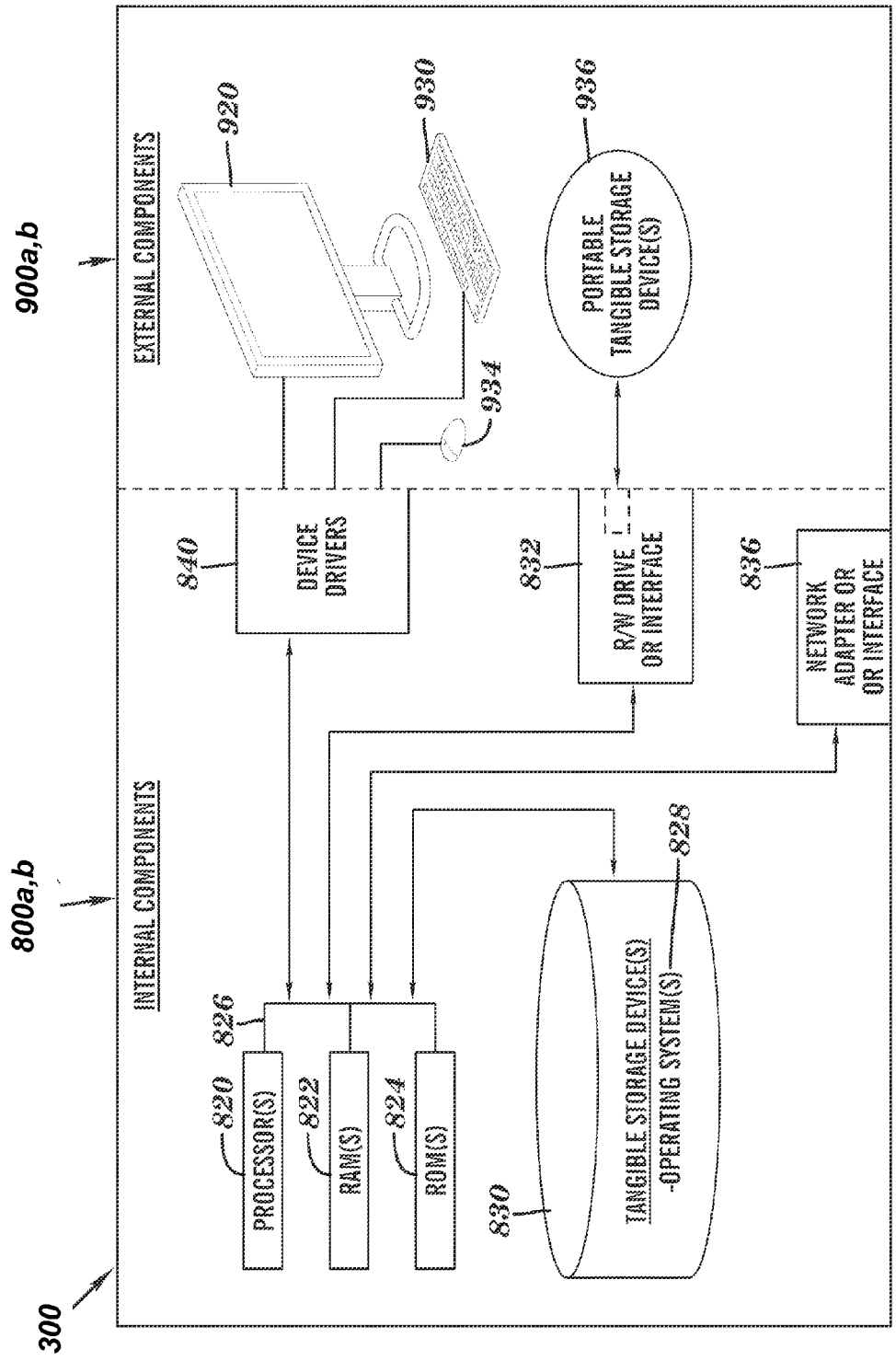
FIG. 3 is a block diagram of internal and external components of computers and servers depicted in FIG. 1 according to at least one embodiment.

FIG. 3 is a block diagram of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 3. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and video conference activator program 108A (FIG. 1) in client computer 102 and video conference activator program 108B in network server computer 112 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as video conference activator program 108A and 108B, can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless Wi-Fi interface cards, or 3 G or 4 G wireless interface cards or other wired or wireless communication links. The video conference activator program 108A in client computer 102 and video conference activator program 108B in network server 112 can be downloaded to client computer 102 from an external computer via a network (for example, the Internet, a local area network or other, wide area network) and respective network adapters or interfaces 836. From the network adapters or interfaces 836, the video conference activator program 108A in client computer 102 and the video conference activator program 108B in network server computer 112 are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for activating a video conference between at least one local watcher using a local communication enabled device and at least one remote watcher using a remote communication enabled device, the method comprising:
   calculating a background noise level;
   in response to determining the calculated background noise level exceeds a predetermined threshold, transmitting an audio signal between the local communication enabled device and the remote communication enabled device;
   detecting the at least one local watcher and the at least one remote watcher at each respective communication enabled device;
   transmitting a video signal between the local communication enabled device and the remote communication enabled device based on the detecting of both the at least one local watcher and the at least one remote watcher at each respective communication enabled device; and
   transmitting a single captured image between the local communication enabled device and the remote communication enabled device based on the detecting of one of the at least one local watcher and the at least one remote watcher at each respective communication enabled device,
   wherein the transmitting of the single captured image reduces bandwidth relative to the transmitting of the video signal and the audio signal.

2. The method of claim 1, further comprising:
   adjusting a screen resolution associated with the local communication enabled device based on a distance between the at least one local watcher and the local communication enabled device; and
   adjusting a screen resolution associated with the remote communication enabled device based on a distance between the at least one remote watcher and the remote communication enabled device.

3. The method of claim 1, wherein the local communication enabled device and the remote communication enabled device comprise a plurality of sensors, a plurality of microphones, and a plurality of cameras.

4. The method of claim 1, wherein the detecting the at least one local watcher and the at least one remote watcher at each respective communication enabled device comprises a use of at least one of a plurality of sensors, a plurality of microphones, and a plurality of cameras associated with the local communication enabled device and the remote communication enabled device.

5. The method of claim 1, wherein the minimizing bandwidth between the local communication enabled device and the remote communication enabled device comprises a ceasing of transmitting of the video signal between the local communication enabled device and the remote communication enabled device based on a lack of detecting the at least one local watcher and a lack of detecting the at least one remote watcher.

6. The method of claim 1 wherein the minimizing bandwidth between the local communication enabled device and the remote communication enabled device comprises a ceasing of the transmission of the audio signal between the local communication enabled device and the remote communication enabled device based on a lack of detecting the at least one local watcher and a lack of detecting the at least one remote watcher.

7. The method of claim 1, wherein the transmitting of the single captured image between the local communication enabled device and the remote communication enabled device comprises a calculation as to whether a current single captured image is similar to a last transmitted single captured image.

8. The method of claim 7, wherein the calculation as to whether the current single captured image is similar to the last transmitted single captured image is performed locally on the local communication enabled device and the remote communication enabled device.

9. A computer system for activating a video conference between at least one local watcher using a local communication enabled device and at least one remote watcher using a remote communication enabled device, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
calculating a background noise level;
in response to determining the calculated background noise level exceeds a predetermined threshold, transmitting an audio signal between the local communication enabled device and the remote communication enabled device;
detecting the at least one local watcher and the at least one remote watcher at each respective communication enabled device;
transmitting a video signal between the local communication enabled device and the remote communication enabled device based on the detecting of both the at least one local watcher and the at least one remote watcher at each respective communication enabled device; and
transmitting a single captured image between the local communication enabled device and the remote communication enabled device based on the detecting of one of the at least one local watcher and the at least one remote watcher at each respective communication enabled device,
wherein the transmitting of the single captured image reduces bandwidth relative to the transmitting of the video signal and the audio signal.

10. The computer system of claim 9, further comprising:
adjusting a screen resolution associated with the local communication enabled device based on a distance between the at least one local watcher and the local communication enabled device; and
adjusting a screen resolution associated with the remote communication enabled device based on a distance between the at least one remote watcher and the remote communication enabled device.

11. The computer system of claim 9, wherein the local communication enabled device and the remote communication enabled device comprise a plurality of sensors, a plurality of microphones, and a plurality of cameras.

12. The computer system of claim 9, wherein the detecting the at least one local watcher and the at least one remote watcher at each respective communication enabled device comprises a use of at least one of a plurality of sensors, a plurality of microphones, and a plurality of cameras associated with the local communication enabled device and the remote communication enabled device.

13. The computer system of claim 9, wherein the minimizing bandwidth between the local communication enabled device and the remote communication enabled device comprises a ceasing of transmitting of the video signal between the local communication enabled device and the remote communication enabled device based on a lack of detecting the at least one local watcher and a lack of detecting the at least one remote watcher.

14. The computer system of claim 9, wherein the minimizing bandwidth between the local communication enabled device and the remote communication enabled device comprises a ceasing of the transmission of the audio signal between the local communication enabled device and the remote communication enabled device based on a lack of detecting the at least one local watcher and a lack of detecting the at least one remote watcher.

15. The computer system of claim 9, wherein the transmitting of the single captured image between the local communication enabled device and the remote communication enabled device comprises a calculation as to whether a current single captured image is similar to a last transmitted single captured image.

16. The computer system of claim 15, wherein the calculation as to whether the current single captured image is similar to the last transmitted single captured image is performed locally on the local communication enabled device and the remote communication enabled device.

17. A computer program product for activating a video conference between at least one local watcher using a local communication enabled device and at least one remote watcher using a remote communication enabled device, the computer program product comprising:
one or more computer-readable storage devices and program instructions stored on at least one of the one or more tangible storage devices, the program instructions executable by a processor, the program instructions comprising:
program instructions to calculate a background noise level;
in response to determining the calculated background noise level exceeds a predetermined threshold, program instructions to transmit an audio signal between the local communication enabled device and the remote communication enabled device;
program instructions to detect the at least one local watcher and the at least one remote watcher at each respective communication enabled device;
program instructions to transmit a video signal between the local communication enabled device and the remote communication enabled device based on the detecting of both the at least one local watcher and the at least one remote watcher at each respective communication enabled device; and
program instructions to transmit a single captured image between the local communication enabled device and the remote communication enabled device based on the detecting of one of the at least one local watcher and the at least one remote watcher at each respective communication enabled device,
wherein the transmitting of the single captured image reduces bandwidth relative to the transmitting of the video signal and the audio signal.

18. The computer program product of claim 17, further comprising:
adjusting a screen resolution associated with the local communication enabled device based on a distance between the at least one local watcher and the local communication enabled device; and
adjusting a screen resolution associated with the remote communication enabled device based on a distance between the at least one remote watcher and the remote communication enabled device.

19. The computer program product of claim 17, wherein the local communication enabled device and the remote communication enabled device comprise a plurality of sensors, a plurality of microphones, and a plurality of cameras.

20. The computer program product of claim 17, wherein the detecting the at least one local watcher and the at least one remote watcher at each respective communication enabled device comprises a use of at least one of a plurality of sensors, a plurality of microphones, and a plurality of cameras associated with the local communication enabled device and the remote communication enabled device.

* * * * *